United States Patent
Yun et al.

(10) Patent No.: US 11,064,137 B2
(45) Date of Patent: Jul. 13, 2021

(54) DUAL-VIEW IMAGE DEVICE FOR MONITORING HEAT SOURCE AND IMAGE PROCESSING METHOD THEREOF

(71) Applicant: INDUSTRIAL TECHNOLOGY RESEARCH INSTITUTE, Hsinchu (TW)

(72) Inventors: Tai-Jie Yun, Taichung (TW); Cheng-Da Ko, Taipei (TW); Ke-Jen Lin, Kaohsiung (TW); Chih-Jen Chen, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 6 days.

(21) Appl. No.: 16/232,486

(22) Filed: Dec. 26, 2018

(65) Prior Publication Data

US 2020/0120290 A1   Apr. 16, 2020

(30) Foreign Application Priority Data

Oct. 15, 2018  (TW) .................................. 107136247

(51) Int. Cl.
*H04N 5/30* (2006.01)
*H04N 5/247* (2006.01)

(52) U.S. Cl.
CPC ............... *H04N 5/30* (2013.01); *H04N 5/247* (2013.01)

(58) Field of Classification Search
CPC .................................. H04N 5/30; H04N 5/247
See application file for complete search history.

(56) References Cited

U.S. PATENT DOCUMENTS 5,299,971 A * 4/1994 Hart ................... G08B 13/1963
                                                       180/167
6,414,314 B1  7/2002 Ikeda
(Continued)

FOREIGN PATENT DOCUMENTS

CN       1279751 C    10/2006
CN     100508598 C     7/2009
(Continued)

OTHER PUBLICATIONS

Taiwanese Office Action and Search Report dated Jul. 2, 2019 for Application No. 107136247.
(Continued)

*Primary Examiner* — Jamie J Atala
*Assistant Examiner* — Hesham K Abouzahra
(74) *Attorney, Agent, or Firm* — Birch, Stewart, Kolasch & Birch, LLP

(57) ABSTRACT

A dual-view image device for monitoring a heat source includes a first thermal image sensor, a second thermal image sensor, a driver and a processor. The first thermal image sensor captures a first thermal image having a heat source within a first view angle. The second thermal image sensor captures a second thermal image having a heat source within a second view angle smaller than the first view angle. The pixels occupied by the heat source in the first thermal image are fewer than that occupied by the heat source in the second thermal image. The driver drives the first and the second thermal image sensor to track and position the heat source within the first and the second view angle. The processor combines the first and the second thermal image into a dual-view image and outputs the dual-view image having the heat source.

18 Claims, 5 Drawing Sheets

(56) References Cited

U.S. PATENT DOCUMENTS

| | | | |
|---|---|---|---|
| 7,346,188 B2 | 3/2008 | Aichi | |
| 9,330,312 B2 | 5/2016 | Brown et al. | |
| 9,483,952 B2 | 11/2016 | Chew | |
| 9,871,999 B2 | 1/2018 | Kardashov | |
| 9,875,556 B2 | 1/2018 | McNally | |
| 9,887,775 B2 | 2/2018 | Puscasu et al. | |
| 9,888,073 B2 | 2/2018 | Ohana et al. | |
| 10,863,098 B2 * | 12/2020 | Priyantha | H04N 13/271 |
| 2006/0175549 A1 * | 8/2006 | Miller | H04N 5/332 250/334 |
| 2007/0235648 A1 * | 10/2007 | Teich | G08B 13/19641 250/330 |
| 2008/0260225 A1 | 10/2008 | Szu | |
| 2014/0139643 A1 * | 5/2014 | Hogasten | H04N 5/33 348/48 |
| 2015/0242683 A1 * | 8/2015 | Tang | G06K 9/00382 382/173 |
| 2018/0096468 A1 * | 4/2018 | Nguyen | H04N 5/2258 |
| 2018/0372548 A1 * | 12/2018 | Gosian | G01J 5/007 |

FOREIGN PATENT DOCUMENTS

| | | |
|---|---|---|
| CN | 103168467 A | 6/2013 |
| CN | 103595916 A | 2/2014 |
| CN | 103986917 B | 4/2017 |
| TW | 572531 | 1/2004 |
| TW | 201205115 A1 | 2/2012 |
| TW | I607276 B | 12/2017 |
| WO | WO 2005/036371 A2 | 4/2005 |

OTHER PUBLICATIONS

Kumar et al., "Improving Person Tracking Using an Inexpensive Thermal Infrared Sensor", 2014 IEEE Conference on Computer Vision and Pattern Recognition Workshops, 2014, pp. 217-224.

Ma et al., "Pedestrian Detection and Tracking from Low-Resolution Unmanned Aerial Vehicle Thermal Imagery", Sensors, 2016, No. 16, vol. 446, total 26 pages.

Mählisch et al., "A Multiple Detector Approach to Low-resolution FIR Pedestrian Recognition", 2005, total 6 pages.

Portmann et al., "People Detection and Tracking from Aerial Thermal Views", 2014 IEEE International Conference on Robotics & Automation (ICRA), Hong Kong Convention and Exhibition Center, May 31-Jun. 7, 2014. Hong Kong, China, pp. 1794-1800.

Teutsch et al., "Low Resolution Person Detection with a Moving Thermal Infrared Camera by Hot Spot Classification", 2014 IEEE Conference on Computer Vision and Pattern Recognition Workshops, 2014, pp. 209-216.

CN Office Action 2018112942064 dated Sep. 27, 2020; pp. 1-8.

* cited by examiner

DUAL-VIEW IMAGE DEVICE FOR MONITORING HEAT SOURCE AND IMAGE PROCESSING METHOD THEREOF

This application claims the benefit of Taiwan application Serial No. 107136247, filed Oct. 15, 2018, the subject matter of which is incorporated herein by reference.

TECHNICAL FIELD

The disclosure relates in general to a dual-view image device for monitoring a heat source and an image processing method thereof.

BACKGROUND

As safety consciousness gradually arises, the application of security surveillance also receives more and more attention. To avoid having dead ends within the surveillance area, normally multiple monitors or cameras are installed to monitor different regions simultaneously.

The user can install multiple monitors in multiple interested regions of the surveillance area, such that the image of each interested region can be sent to a central console where the control personnel can perform a comprehensive surveillance to assure that no dead end appears. However, the current monitor only has mono lens and mono view, and is unable to perform multi-image detection and all-day monitoring for the same surveillance area. Particularly, when an object invades the surveillance area during the nighttime, the watcher is unable to track the invader in the image or lacking a partial enlargement of the image, can only rely on the monitors installed at different places to recognize the invader in the image. Therefore, the current monitor cannot efficiently provide clear images for the user's viewing and reference.

SUMMARY

The present disclosure relates to a dual-view image device for monitoring a heat source. The dual-view image device can track the heat source within a surveillance area and provides a dual-view thermal image for the user's viewing and reference.

According to one embodiment of the present disclosure, a dual-view image device for monitoring a heat source is provided. The dual-view image device includes a first thermal image sensor, a second thermal image sensor, a driver and a processor. The first thermal image sensor has a first view angle and is configured to capture a first thermal image having a heat source within the first view angle. The second thermal image sensor has a second view angle and is configured to capture a second thermal image having the heat source within the second view angle. The second view angle is smaller than the first view angle. The pixels occupied by the heat source in the first thermal image are fewer than that occupied by the heat source in the second thermal image. The driver is configured to drive the first thermal image sensor and the second thermal image sensor to track and position the heat source within the first and the second view angles. The processor is configured to combine the first thermal image and the second thermal image into a dual-view image and output the dual-view image having the heat source.

According to another embodiment of the present disclosure, a dual-view image processing method for monitoring a heat source is provided. The dual-view image processing method includes the following steps. Firstly, a heat source is detected by a first thermal image sensor having a first view angle, wherein the first thermal image sensor captures a first thermal image having the heat source within the first view angle. Then, the heat source is detected by a second thermal image sensor having a second view angle, wherein the second view angle is smaller than the first view angle, the second thermal image sensor captures a second thermal image having the heat source within a second view angle, and the pixels occupied by the heat source in the first thermal image are fewer than that occupied by the heat source in the second thermal image. Then, the first thermal image sensor and the second thermal image sensor are driven to track and position the heat source within the first and the second view angle. Then, the first thermal image and the second thermal image are combined into a dual-view image and the dual-view image having the heat source is outputted.

The above and other aspects of the disclosure will become understood with regard to the following detailed description of the preferred but non-limiting embodiment(s). The following description is made with reference to the accompanying drawings.

DETAILED DESCRIPTION

Detailed descriptions of the disclosure are disclosed below with a number of embodiments. However, the disclosed embodiments are for explanatory and exemplary purposes only, not for limiting the scope of protection of the disclosure. Similar/identical designations are used to indicate similar/identical elements. Directional terms such as above, under, left, right, front or back are used in the following embodiments to indicate the directions of the accompanying drawings, not for limiting the present disclosure.

According to an embodiment of the present disclosure, a dual-view image device for monitoring a heat source is provided. The dual-view image device includes two thermal image sensors having different view angles for monitoring a target heat source (such as a human or an animal) within a surveillance area. When the target heat source is located within the visible range of large view angle, the dual-view thermal image sensors can be simultaneously moved or the image sensor having a small view angle can be moved to track the heat source, such that the target heat source can be simultaneously located within both the visible ranges of large view angle and small view angle. Then, the dual-view images having the heat source are combined by the processor and outputted to a display device for the control personnel to determine the location of the heat source or for the monitoring system to send an abnormality warning to notify the control personnel.

Figure 1:
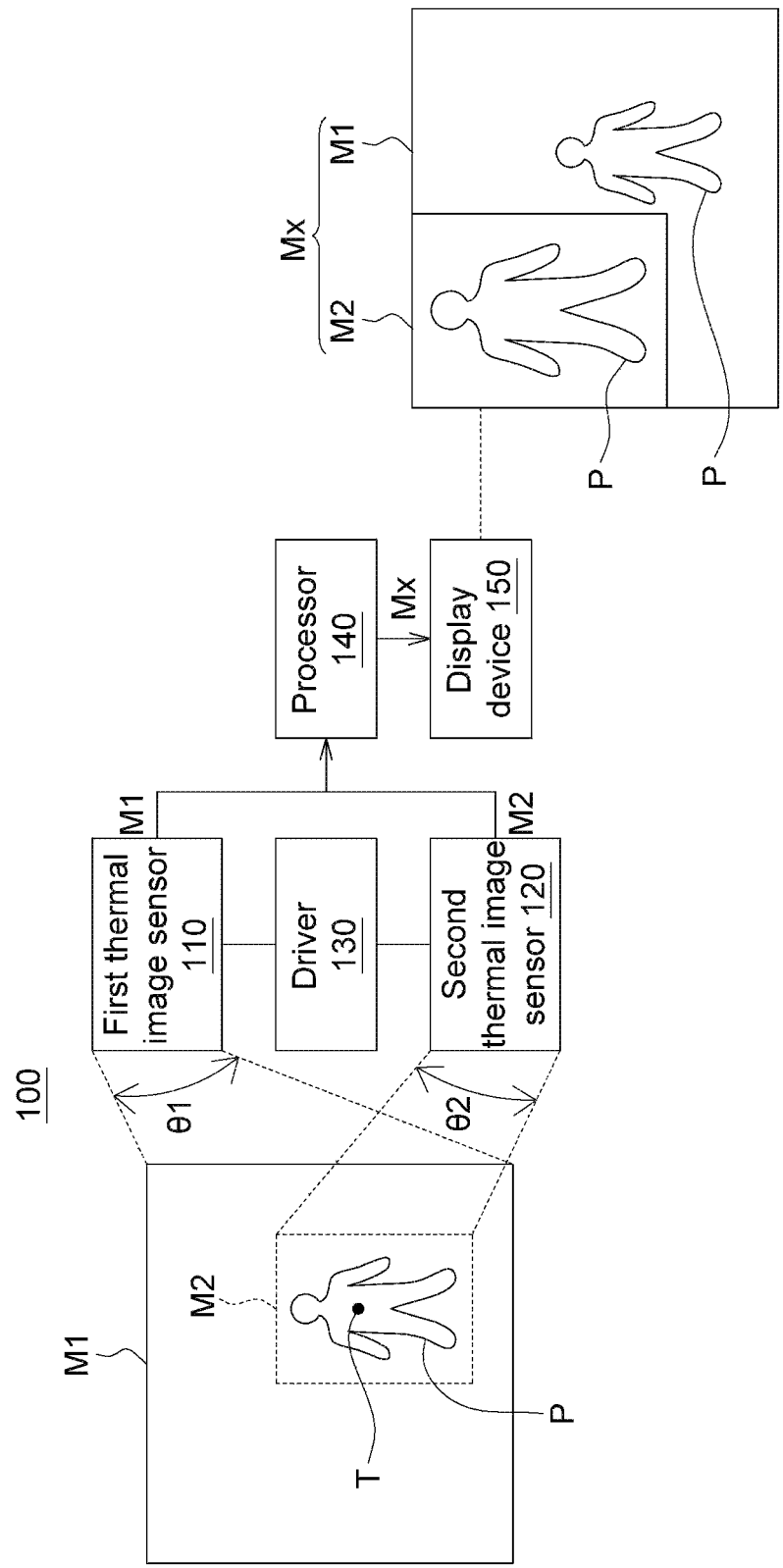
FIG. 1 is a schematic diagram of a dual-view image device for monitoring a heat source according to an embodiment of the present disclosure.

Refer to FIG. 1. The dual-view image device 100 for monitoring a heat source includes a first thermal image sensor 110, a second thermal image sensor 120, a driver 130, a processor 140 and a display device 150. The first thermal image sensor 110 has a first view angle θ1 (or visible range), and the second thermal image sensor 120 has a second view angle θ2 (or visible range). In an embodiment, the second view angle θ2 is smaller than the first view angle θ1, therefore the visible range of the first thermal image sensor 110 is larger than the visible range of the second thermal image sensor 120. For example, the first view angle θ1 is between 100-120 degrees and the second view angle θ2 is between 60-90 degrees, but the present disclosure is not limited thereto.

The first thermal image sensor 110, which can be made by a wide-angle camera with image tracking function, is disposed on the driver 130. The first thermal image sensor 110 can scan a surveillance area at a specific location to detect whether a heat source P appears within the surveillance area. The wide-angle camera, having a wide angle such as 100 degrees or above, can perform a full-range scan on the surveillance area of large view angle to avoid having any dead ends within the surveillance area.

The second thermal image sensor 120, which can be made by a narrow-angle camera with image tracking function, is disposed on the driver 130. The first thermal image sensor 110 and the second thermal image sensor 120 can be co-axially disposed on the driver 130 and simultaneously rotated by the same angle to track a heat source P. In another embodiment, the first thermal image sensor 110 and the second thermal image sensor 120 can be hetero-axially disposed on the driver 130 and rotated by respectively angles to track the heat source P. Since the view angle of the second thermal image sensor 120 is smaller than that of the first thermal image sensor 110, the second thermal image sensor 120 can detect a partial small-angle region, particularly the partial region where the heat source P appears, such that the scope of surveillance can be reduced. Meanwhile, the second thermal image sensor 120 can track the heat source P and provide a partial image.

In an embodiment, when it is detected that the heat source P appears within a surveillance area, the first thermal image sensor 110 calculates the feature point coordinates T, such as the center point coordinates, of the heat source P for the second thermal image sensor 120 to track the heat source P. The second thermal image sensor 120 can locate the local region of the heat source P according to the feature point coordinates T of the heat source P and perform a small-angle scan to determine whether the heat source P still appears in the region of small view angle.

The driver 130, such as a motor and a gear set, is configured to simultaneously or individually drive the first thermal image sensor 110 and the second thermal image sensor 120. The driver 130 can also be an actuator for simultaneously or individually actuating the first thermal image sensor 110 and the second thermal image sensor 120. In an embodiment, the surveillance system can determine the feature point coordinates T of the heat source P according to the feedback of an image signal and generate a drive command to the driver 130 to simultaneously or individually rotate the first thermal image sensor 110 and the second thermal image sensor 120 to the angle and orientation of the local region of the heat source P. Therefore, the first thermal image sensor 110 and/or the second thermal image sensor 120 can be moved to a pre-detected position to track the heat source P according to the drive command, such that the heat source P is located within the view angle (or visible range) of the first thermal image sensor 110 and/or the second thermal image sensor 120.

Refer to FIG. 1. The first thermal image sensor 110 is configured to capture a first thermal image M1 having a heat source P within a first view angle θ1; the second thermal image sensor 120 is configured to capture a second thermal image M2 having the heat source P within a second view angle θ2, wherein the pixels occupied by the heat source P in the first thermal image M1 are fewer than the pixels occupied by the heat source P in the second thermal image M2.

Refer to FIG. 1. The first thermal image M1 can be a full-range image, and the second thermal image M2 can be an image of a partial region. The first thermal image M1 and the second thermal image M2 may have the same pixels or the same image resolution, such as 640×480 pixels. In another embodiment, the image resolution of the second thermal image M2 is larger than the image resolution of the first thermal image M1. Given that the image resolution is the same, fewer pixels are occupied by the heat source P in the first thermal image M1 than in the second thermal image M2. Therefore, detailed features of the heat source P cannot be presented and the image of the heat source P is not clear. On the contrary, more pixels are occupied by the heat source P in the second thermal image M2 than in the first thermal image M1. Therefore, detailed features of the heat source P can be presented and the image of the heat source P is clearer. Besides, in order to increase the image resolution, the first thermal image M1 and/or the second thermal image M2 can increase image quality through sub-pixel complement.

The processor 140 is configured to combine the first thermal image M1 and the second thermal image M2 into a dual-view image Mx and output the dual-view image Mx having the heat source P to the display device 150 for the user's viewing and reference. In an embodiment, the processor 140 not only combines the first thermal image M1 and the second thermal image M2 into a dual-view image Mx but further synchronizes the coordinate information of the first thermal image M1 and the second thermal image M2. The processor 140, which can be exemplified by such as a digital image mixer or a multiplex processor, can combine the thermal images of large view angle and of small view angle to satisfy the requirements of security surveillance with the dual-view thermal image.

Figure 2:
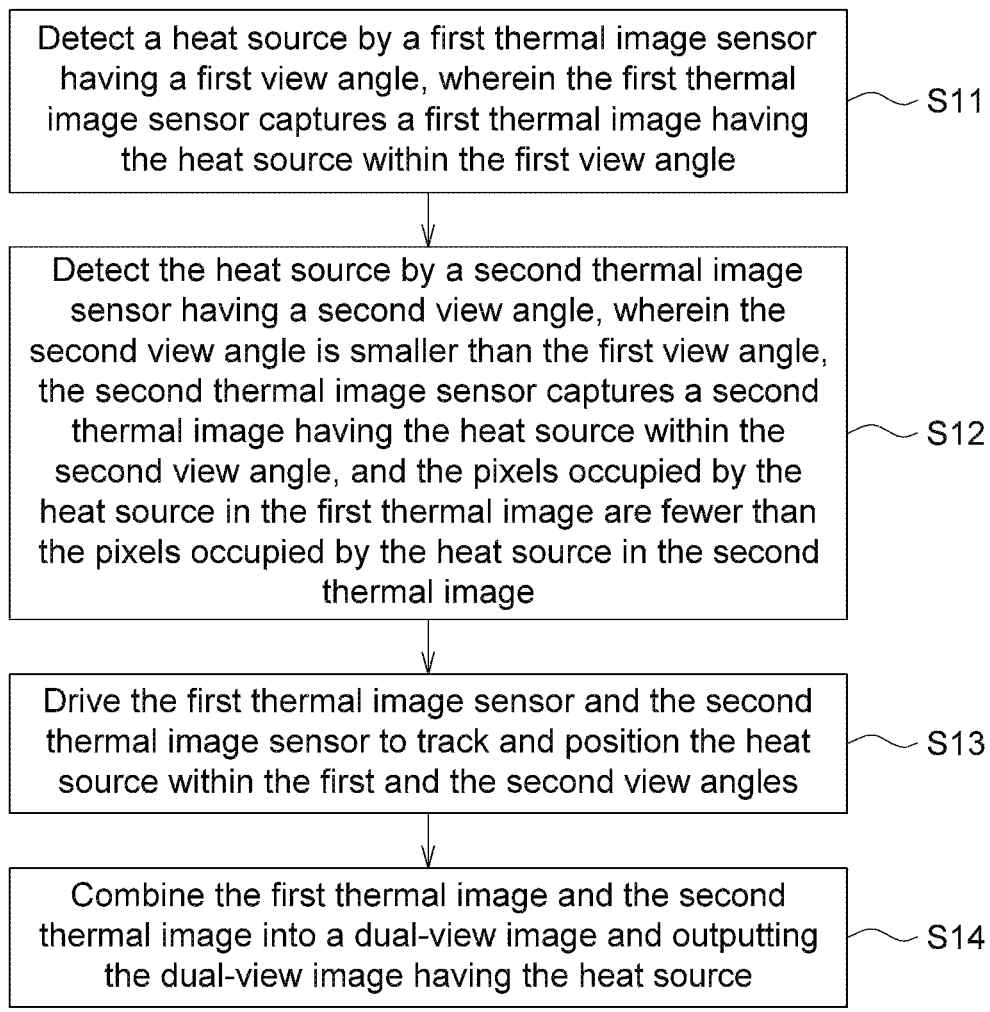
FIG. 2 is a schematic diagram of a dual-view image processing method for monitoring a heat source according to an embodiment of the present disclosure.

Refer to FIGS. 1 and 2. The dual-view image processing method for monitoring a heat source P includes the following steps S11-S14. Firstly, the method begins at step S11, a heat source P is detected by a first thermal image sensor 110 having a first view angle θ1, wherein the first thermal image sensor 110 captures a first thermal image M1 having the heat source P within the first view angle θ1. Then, in step S12, the heat source P is detected by a second thermal image sensor 120 having a second view angle θ2, wherein the second view angle θ2 is smaller than the first view angle θ1, the second thermal image sensor 120 captures a second thermal image M2 having the heat source P within the second view angle θ2, and the pixels occupied by the heat source P in the first thermal image M1 are fewer than that occupied by the heat source P in the second thermal image M2. Then, in step S13, the first thermal image sensor 110 and the second thermal image sensor 120 are driven to track the heat source P and position of the heat source P within the first view angle θ1 and the second view angle θ2. Then, in step S14, the first thermal image M1 and the second thermal image M2 are combined into a dual-view image Mx and the dual-view image Mx having the heat source P is outputted.

Using the above image processing technique, the user can view both the heat source P within the first view angle θ1 and the heat source P within the second view angle θ2, wherein the heat source image P within the second view angle θ2 is relatively larger than the heat source image P within the first view angle θ1, such that the user can more conveniently recognize detailed features, such as eyes, nose and mouth, of the heat source P.

Moreover, before the first thermal image M1 and the second thermal image M2 are combined into the dual-view image Mx, the quality of the first thermal image M1 and/or that of the second thermal image M2 can further be increased using sub-pixel complement to increase the image resolution. The image processing method for sub-pixel complement includes the following steps. Firstly, a thermal image with low resolution is obtained, and corresponding coordinates of each pixel are calculated according to the stitched sequence of the thermal image with low resolution. Then, the corresponding coordinates of the pixels in the thermal image with high resolution are supplemented according to the corresponding coordinates of each pixel. The unknown pixels in the thermal image with high resolution are supplemented using average values of the known pixels. Detailed steps of the dual-view image processing method are disclosed below.

Figure 3:
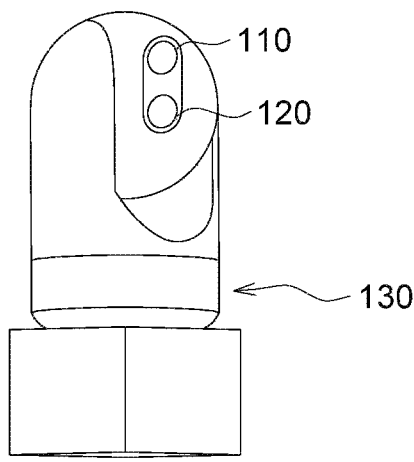
FIG. 3 is a schematic diagram of an image tracking structure in which the first thermal image sensor and the second thermal image sensor of FIG. 1 are co-axially disposed on a driver.
Figure 4:
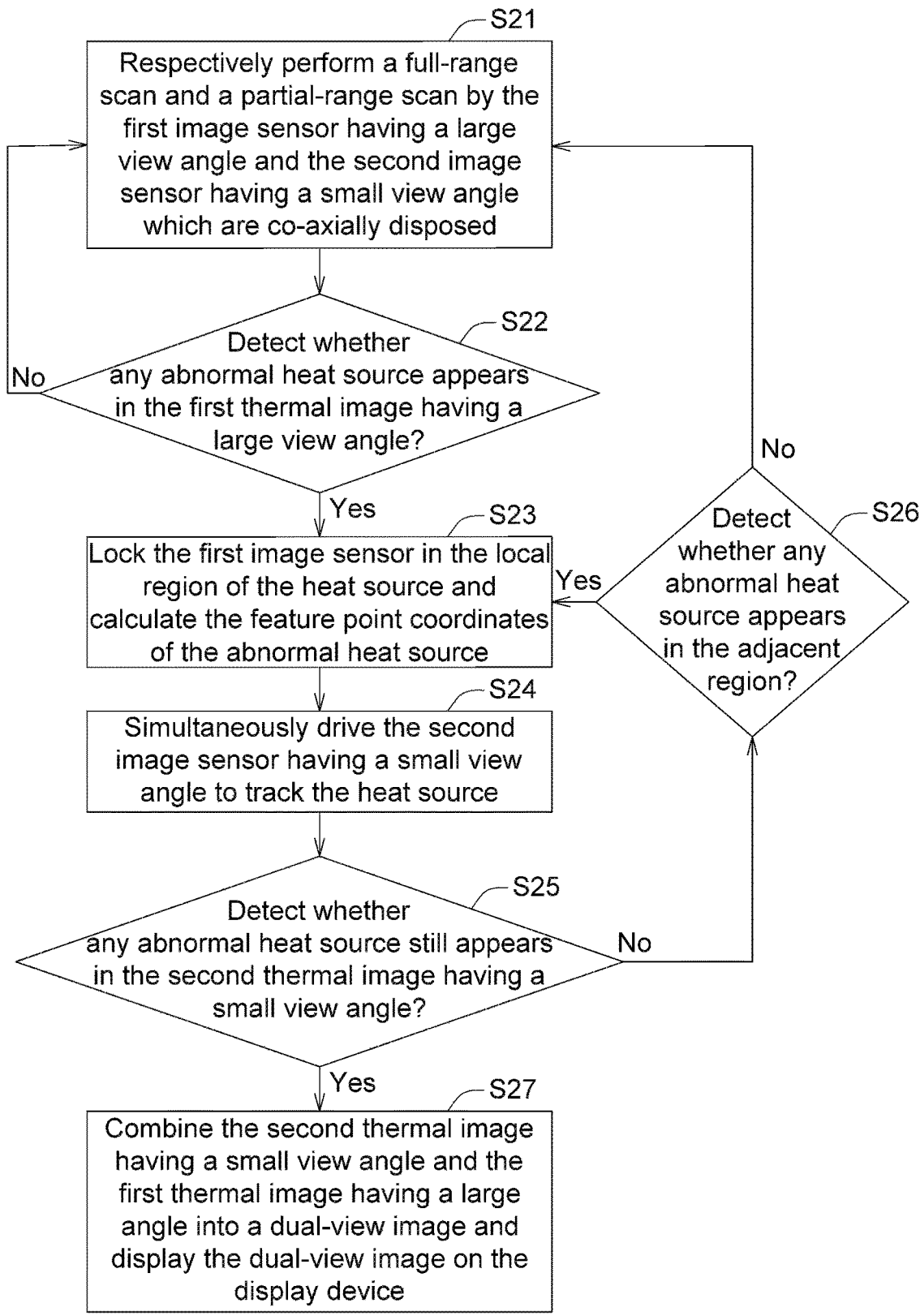
FIG. 4 is a flowchart of a dual-view image processing method using the image tracking structure of FIG. 3.

Refer to FIGS. 3 and 4. FIG. 3 is a schematic diagram of an image tracking structure in which the first thermal image sensor 110 and the second thermal image sensor 120 of FIG. 1 are co-axially disposed on a driver 130. FIG. 4 is a flowchart of a dual-view image processing method using the image tracking structure of FIG. 3. As indicated in FIG. 3, the first thermal image sensor 110 and the second thermal image sensor 120 are co-axially disposed on the driver 130, and can be moved horizontally or vertically such that the surveillance area can cover both scopes of the horizontal and the vertical view angles, and the dual-view image can be synchronized and simultaneously positioned.

As indicated in FIG. 4, the dual-view image processing method 200 includes the following steps S21-S27. Firstly, in step S21, a full-range scan and a partial-range scan are respectively performed by the first image sensor having a large view angle and the second image sensor having a small view angle, which are co-axially disposed. Then, in step S22, whether any abnormal heat source appears in the first thermal image having a large view angle is detected. If the detection in step S22 is affirmative, the method proceeds to step S23; otherwise the method returns to step S21 to continue the detection of abnormal heat source. In step S23, the first image sensor having a large view angle is locked in the local region of the heat source and the feature point coordinates of the abnormal heat source are calculated. Then, in step S24, the second image sensor having a small view angle is simultaneously driven to track the heat source. Additionally, a sub-pixel complement scan can be performed to increase the image resolution. Then, in step S25, whether any abnormal heat source still appears in the second thermal image having a small view angle is detected. If the detection in step S25 is affirmative, the method proceeds to step S27; otherwise the method proceeds to step S26. In step S26, the first thermal image sensor having a large view angle is simultaneously driven to an adjacent region and whether any abnormal heat source appears in the adjacent region is detected. If the detection in step S26 is affirmative, the method proceeds to step S23; otherwise the method returns to step S21. In step S27, the second thermal image having a small view angle and the first thermal image having a large view angle are combined into a dual-view image and the dual-view image is displayed on the display device.

Figure 5:
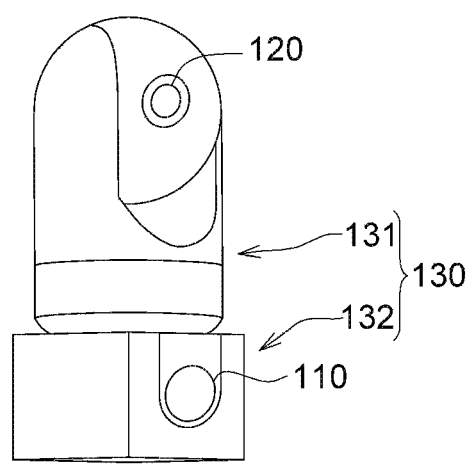
FIG. 5 is a schematic diagram of an image tracking structure in which the first thermal image sensor and the second thermal image sensor of FIG. 1 are hetero-axially disposed on a driver.
Figure 6:
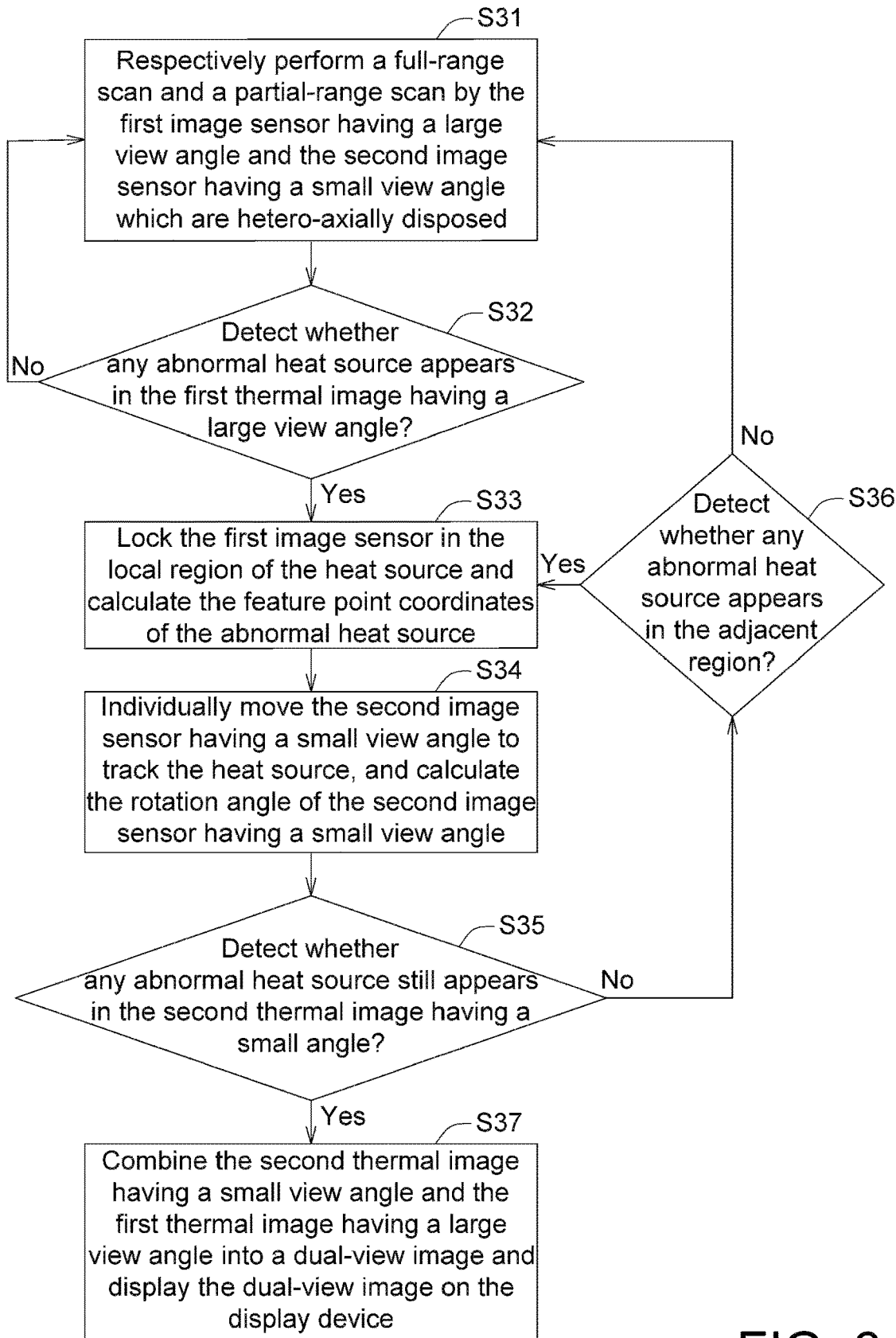
FIG. 6 is a flowchart of a dual-view image processing method using the image tracking structure of FIG. 5.

Refer to FIGS. 5 and 6. FIG. 5 a schematic diagram of an image tracking structure in which the first thermal image sensor 110 and the second thermal image sensor 120 of FIG. 1 are hetero-axially disposed on a driver 130. FIG. 6 is a flowchart of a dual-view image processing method using the image tracking structure of FIG. 5. As indicated in FIG. 5, the first thermal image sensor 110 can be a fixed type wide-view angle camera or a horizontally rotatable wide-view angle camera; the driver 130 can individually drive the first thermal image sensor 110 and the second thermal image sensor 120. The driver 130 includes a first drive unit 131 and a second drive unit 132, wherein the first drive unit 131 is configured to drive the first thermal image sensor 110, and the second drive unit 132 is configured to drive the second thermal image sensor 120. The second thermal image sensor 120 can be moved horizontally and vertically, such that the surveillance area of the second thermal image sensor 120 can cover both scopes of the horizontal and the vertical view angles.

As indicated in FIG. 6, the dual-view image processing method 300 includes the following steps S31-S37. Firstly, in step S31, a full-range scan (such as fixed angle scan) and a partial-range scan are respectively performed by the first thermal image sensor having a large view angle and the second thermal image sensor having a small view angle, which are hetero-axially disposed. Then, in step S32, whether any abnormal heat source appears in the first thermal image having a large view angle is detected. If the detection in step S32 is affirmative, the method proceeds to step S33; otherwise the method returns to step S31 to continue the detection of abnormal heat source. In step S33, the first thermal image sensor having a large view angle is locked in the local region of the heat source and the feature point coordinates of the heat source are calculated. Then, in step S34, the second thermal image sensor having a small view angle is individually moved to track the heat source, and the rotation angle of the second thermal image sensor having a small view angle is calculated. Additionally, a sub-pixel complement scan can be performed to increase the image resolution. Then, in step S35, whether any abnormal heat source still appears in the second thermal image having a small view angle is detected. If the detection in step S35 is affirmative, the method proceeds to step S37; otherwise the method proceeds to step S36. In step S36, the first thermal image sensor having a large view angle is individually rotated and whether abnormal heat source appears in an adjacent region is detected. If the detection in step S36 is affirmative, the method proceeds to step S33; otherwise the method returns to step S31. In step S37, the second thermal image having a small view angle and the first thermal image having a large view angle are combined into a dual-view image and the dual-view image is displayed on the display device.

According to the dual-view image device for monitoring a heat source and an image processing method thereof disclosed in above embodiments of the present disclosure, the heat source can be monitored and tracked in the full range, a partial image of the local region of the heat source can be provided, and the dual-view thermal image sensors can be simultaneously moved to track the heat source or the small view angle image sensor can be individually moved to track the heat source, such that target heat source is located within both the visible ranges of the large view angle and the small view angle. Thus, the dual-view image device of the present embodiment can detect the same surveillance area from multi-angles for the user's viewing and reference to satisfy the requirements of security surveillance with multi-view thermal image.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A dual-view image device for monitoring a heat source, comprising:
    a first thermal image sensor having a first view angle, wherein the first thermal image sensor is configured to capture a first thermal image having a heat source within the first view angle;
    a second thermal image sensor having a second view angle, wherein the second view angle is smaller than the first view angle, the second thermal image sensor is configured to capture a second thermal image having the heat source within the second view angle, and pixels occupied by the heat source in the first thermal image are fewer than pixels occupied by the heat source in the second thermal image;
    a driver configured to drive the first thermal image sensor and the second thermal image sensor individually to track and position the heat source within the first and the second view angles; and
    a processor configured to combine the first thermal image and the second thermal image into a dual-view image and output the dual-view image having the heat source,
    wherein the processor performs a sub-pixel complement by calculating coordinates of each pixel in the first thermal image with low resolution, and coordinates of pixels of the heat source in the second thermal image with high resolution are supplemented according to the corresponding coordinates of each pixel of the heat source in the first thermal image with low resolution, and unknown pixels of the heat source in the second thermal image with high resolution are supplemented using average values of known pixels of the heat source.

2. The device according to claim 1, wherein the first thermal image sensor performs a full-range scan on a surveillance area to detect whether the heat source appears within the surveillance area.

3. The device according to claim 2, wherein the first thermal image sensor provides feature point coordinates of the heat source for the second thermal image sensor to track the heat source.

4. The device according to claim 3, wherein the second thermal image sensor locates the local region of the heat source according to the feature point coordinates of the heat source and performs a small view angle scan.

5. The device according to claim 4, wherein the driver individually drives the first thermal image sensor and the second thermal image sensor according to the feature point coordinates of the heat source.

6. The device according to claim 1, wherein the first thermal image sensor and the second thermal image sensor are hetero-axially disposed on the driver.

7. The device according to claim 1, wherein the first thermal image and the second thermal image have same pixels.

8. The device according to claim 1, further comprising a display device configured to display the dual-view image having the heat source.

9. The device according to claim 1, wherein the first thermal image sensor and the second thermal image sensor individually track the heat source, when the heat source is located within the first view angle and not within the second view angle, a rotation angle of the second thermal image sensor is calculated with respect to a local region where the heat source is located and the second thermal image sensor is driven to the local region, when the heat source is not located within the first view angle, the driver drives the first thermal image sensor to an adjacent region of the local region to detect whether the heat source is in the adjacent region.

10. A dual-view image processing method for monitoring a heat source, comprising:
    detecting a heat source by a first thermal image sensor having a first view angle, wherein the first thermal image sensor captures a first thermal image having the heat source within the first view angle;
    detecting the heat source by a second thermal image sensor having a second view angle, wherein the second view angle is smaller than the first view angle, the second thermal image sensor captures a second thermal image having the heat source within the second view angle, and pixels occupied by the heat source in the first thermal image are fewer than pixels occupied by the heat source in the second thermal image;
    driving the first thermal image sensor and the second thermal image sensor to track and position the heat source within the first and the second view angles;
    performing a sub-pixel complement by calculating coordinates of each pixel in the first thermal image with low resolution, and coordinates of pixels of the heat source in the second thermal image with high resolution are supplemented according to the corresponding coordinates of each pixel of the heat source in the first thermal image with low resolution, and unknown pixels of the heat source in the second thermal image with high resolution are supplemented using average values of known pixels of the heat source; and
    combining the first thermal image and the second thermal image into a dual-view image and outputting the dual-view image having the heat source.

11. The method according to claim 10, wherein the first thermal image sensor performs a full-range scan on a surveillance area to detect whether the heat source appears within the surveillance area.

12. The method according to claim 11, wherein the first thermal image sensor provides feature point coordinates of the heat source for the second thermal image sensor to track the heat source.

13. The method according to claim 12, wherein the second thermal image sensor locates the local region of the heat source according to the feature point coordinates of the heat source and performs a small view angle scan.

14. The method according to claim 13, wherein a driver individually drives the first thermal image sensor and the second thermal image sensor according to the feature point coordinates of the heat source.

15. The method according to claim 10, wherein the first thermal image sensor and the second thermal image sensor are hetero-axially disposed on a driver.

16. The method according to claim 10, wherein the first thermal image and the second thermal image have same pixels.

17. The method according to claim 10, further comprising displaying the dual-view image having the heat source on a display device.

18. The method according to claim 10, wherein the first thermal image sensor and the second thermal image sensor individually track the heat source, when the heat source is located within the first view angle and not within the second view angle, a rotation angle of the second thermal image sensor is calculated with respect to a local region where the heat source is located and the second thermal image sensor is driven to the local region, when the heat source is not located within the first view angle, the driver drives the first thermal image sensor to an adjacent region of the local region to detect whether the heat source is in the adjacent region.

* * * * *